(12) United States Patent
Eun et al.

(10) Patent No.: US 7,816,051 B2
(45) Date of Patent: Oct. 19, 2010

(54) FUEL CELL SYSTEM

(75) Inventors: Yeong Chan Eun, Gyeonggi-do (KR); Seong Jin An, Gyeonggi-do (KR); Jun Won Suh, Gyeonggi-do (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1017 days.

(21) Appl. No.: 11/593,065

(22) Filed: Nov. 6, 2006

(65) Prior Publication Data
US 2007/0122680 A1    May 31, 2007

(30) Foreign Application Priority Data
Nov. 10, 2005    (KR) ...................... 10-2005-0107751

(51) Int. Cl.
*H01M 8/24* (2006.01)
(52) U.S. Cl. ..................................... 429/460
(58) Field of Classification Search ................... 429/35, 429/38
See application file for complete search history.

(56) References Cited

U.S. PATENT DOCUMENTS 6,689,502 B2 *    2/2004    Choi ............................ 429/32
7,579,101 B2 *    8/2009    Choi ............................ 429/35
7,638,219 B2    12/2009    Komura et al.

FOREIGN PATENT DOCUMENTS

JP    2005-108850    4/2005
KR    10-2005-0060904    6/2005

* cited by examiner

*Primary Examiner*—Patrick Ryan
*Assistant Examiner*—Thomas H. Parsons
(74) *Attorney, Agent, or Firm*—Robert E. Bushnell, Esq.

(57) ABSTRACT

A plate type fuel cell system includes: an electric generator including a membrane-electrode assembly having a plurality of anode electrodes and a plurality of cathode electrodes arranged on opposite surfaces of a proton-exchange membrane and spaced apart from each other; an anode separator facing the plurality of anode electrodes and having a fluid channel adapted to receive a hydrogen containing fuel; a cathode separator facing the plurality of cathode electrodes and having an air ventilating hole; a fuel distributor having an accommodating part defined by a rib to accommodate the anode separator and adapted to distribute the hydrogen containing fuel to each of the plurality of anode electrodes, the rib being partially cut out to define a rib cutting part; and a sealing member contained within the rib cutting part. With this configuration, reaction fluid, such as a hydrogen containing fuel, is effectively prevented from leaking through the rib cutting part or a frame cutting part, thereby enhancing the stability of a stack and the power generation efficiency of the fuel cell system.

21 Claims, 7 Drawing Sheets

FUEL CELL SYSTEM

CLAIM OF PRIORITY

This application makes reference to, incorporates the same herein, and claims all benefits accruing under 35 U.S.C. §119 from an application for PLATE TYPE FUEL CELL SYSTEM earlier filed in the Korean Intellectual Property Office on the 10$^{th}$ of Nov. 2005 and there duly assigned Ser. No. 10-2005-107751.

BACKGROUND OF THE INVENTION

1. Field of the Invention

The present invention relates to a plate type fuel cell system in which unit cells generating electricity by an electrochemical reaction between hydrogen and oxygen are arranged on a plane, and more particularly, to a plate type fuel cell system which can prevent a reaction fluid, such as a hydrogen containing fuel, from leaking through a part around an output terminal provided for extracting electricity generated by the electrochemical reaction between hydrogen and oxygen in a stack, thereby enhancing a sealing effect.

2. Description of the Related Art

In general, a fuel cell system generates electricity by an electrochemical reaction between hydrogen obtained from a hydrocarbonaceous fuel, such as natural gas, or a hydrogen containing fuel, such as methanol, etc., and oxygen in air, which has attracted attention as an alternative to solving environmental or resource problems.

The fuel cell system is a power generator that generates the electricity by the electrochemical reaction between hydrogen from the hydrogen containing fuel and air used as an oxidant. Such a fuel cell system basically includes an electric generator for generating the electricity. The electric generator includes a unit cell provided with a membrane electrode assembly that has an electrolyte membrane having selective ion permeability, and anode and cathode electrodes provided on opposite sides of the electrolyte membrane.

Fuel cell systems are classified into Phosphoric Acid Fuel Cells (PAFCs), Molten Carbon Fuel Cells (MCFCs), Solid Oxide Fuel Cells (SOFCs), Polymer Electrolyte Membrane Fuel Cells (PEMFCs), Alkaline Fuel Cells (AFCs), Direct Methanol Fuel Cells (DMFCs), etc. according to the electrolyte used. Among such fuel cell systems, PEMFC systems have relatively excellent output characteristics, operate at low temperature, start quickly and have a short response time, such that PEMFC systems have been widely developed and researched for use as portable power generators. However, PEMFCs systems need a reformer to obtain hydrogen from the hydrogen containing fuel, which puts a limitation on miniaturizing the fuel cell system. To overcome this limitation, a Direct Methanol Fuel Cell (DMFC) has been developed that directly uses methanol as the hydrogen containing fuel.

DMFCs can be classified into stacked DMFCs and plate type DMFCs according to the structures of the unit cells. A stacked DMFC has unit cells which are stacked, and a plate type DMFC has unit cells which are arranged on a plane. However, plate type DMFCs have a problem in that reaction fluid leaks between adjacent unit cells.

FIG. 11 is a view of a fuel cell stack, referred to in Korean Patent Publication No. 2005-60904, in which a sealing member is interposed between a separator and an electrolyte membrane of a membrane-electrode assembly, and having a plurality of grooves formed around the separator contacting the sealing member.

FIG. 12 is a view of a direct liquid fuel cell stack, referred to in Japanese Patent Publication No. 2005-108850, in which a bipolar plate includes a groove having a predetermined depth surrounding an electrode region for anode and cathode electrodes, and a fuel passage hole, which are formed on each surface thereof. A sealing member is formed in the groove.

However, the foregoing fuel cells have a stacked structure, so that there is a limit to apply them to a plate type structure of which the unit cells are arranged on a plane. In other words, it is difficult to effectively prevent the reaction fluid from leaking between the adjacent unit cells of the plate type fuel cell system. In particular, a reaction fluid, such as a hydrogen containing fuel, is likely to leak through a part around an output terminal provided for extracting electricity generated by an electrochemical reaction between hydrogen and oxygen in a stack.

SUMMARY OF THE INVENTION

Accordingly, it is an object of the present invention to provide a plate type fuel cell system which can prevent a reaction fluid, such as a hydrogen containing fuel, from leaking through a part around an output terminal provided for extracting electricity generated by an electrochemical reaction between hydrogen and oxygen in a stack.

The foregoing and/or other objects of the present invention are achieved by providing a plate type fuel cell system including: an electric generator including a membrane-electrode assembly having a plurality of anode electrodes and a plurality of cathode electrodes arranged on opposite surfaces of a proton-exchange membrane and spaced apart from each other; a plurality of anode separators facing the plurality of anode electrodes, respectively and each of which has a fluid channel adapted to receive a hydrogen containing fuel; a plurality of cathode separators facing the plurality of cathode electrodes, respectively and each of which has an air ventilating hole; a fuel distributor having a plurality of accommodating parts defined by a rib to accommodate the plurality of anode separators, respectively and adapted to distribute the hydrogen containing fuel to each of the plurality of anode electrodes, the rib being partially cut out to define a rib cutting part; and a sealing member contained within the rib cutting part.

The rib cutting part preferably includes a groove.

The plate type fuel cell system preferably further includes a fuel feeder adapted to supply the fuel distributor with the hydrogen containing fuel.

The anode separator preferably includes an extending projection extended outwardly through the rib cutting part.

The accommodating part of the fuel distributor preferably includes first and second openings adapted to pass the hydrogen containing fuel.

The fuel distributor preferably includes a fuel supplying manifold connected to and communicating with the first opening of the accommodating part, and a fuel discharging manifold connected to and communicating with the second opening.

The accommodating part is preferably arranged on opposite surfaces of the fuel distributor.

The plate type fuel cell system preferably further includes an end frame having a plurality of seating parts adapted to seat the plurality of cathode separators, respectively. The end frame is preferably partially cut out to define a frame cutting part.

The cathode separator preferably includes an extending projection extended outwardly through the frame cutting part.

The plate type fuel cell system preferably further includes a sealing member contained within the frame cutting part.

The frame cutting part preferably includes a groove.

The foregoing and/or other objects of the present invention are also achieved by providing a plate type fuel cell system including: an electric generator including a membrane-electrode assembly having a plurality of anode electrodes and a plurality of cathode electrodes arranged on opposite surfaces of a proton-exchange membrane; a plurality of anode separators facing the plurality of anode electrodes, respectively and each of which has a fluid channel adapted to receive a hydrogen containing fuel, each anode separator having a first extending projection; a plurality of cathode separators facing the plurality of cathode electrodes, respectively and each of which has an air ventilating hole, each cathode separator having a second extending projection; a fuel distributor having a plurality of accommodating parts defined by a rib to accommodate the plurality of anode separators, respectively and adapted to distribute the hydrogen containing fuel to each of the plurality of anode electrodes, the rib being partially cut out to define a rib cutting part; and a sealing member contained within the rib cutting part, the sealing member having a hexahedron shape and having an opening adapted to receive the first extending projection of the anode separator.

The rib cutting part preferably includes a groove.

The accommodating part of the fuel distributor preferably includes first and second openings adapted to pass the hydrogen containing fuel.

The fuel distributor preferably includes a fuel supplying manifold connected to and communicating with the first opening of the accommodating part, and a fuel discharging manifold connected to and communicating with the second opening.

The accommodating part is preferably arranged on opposite surfaces of the fuel distributor.

The plate type fuel cell system preferably further includes an end frame having a plurality of seating parts adapted to seat each of the plurality of cathode separators. The end frame is preferably partially cut out to define a frame cutting part.

The plate type fuel cell system preferably further includes a sealing member contained within the frame cutting part, the sealing member having a hexahedron shape and having an opening adapted to receive the second extending projection of the cathode separator.

The frame cutting part preferably includes a groove.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention are described with reference to the accompanying drawings.

Figure 1:
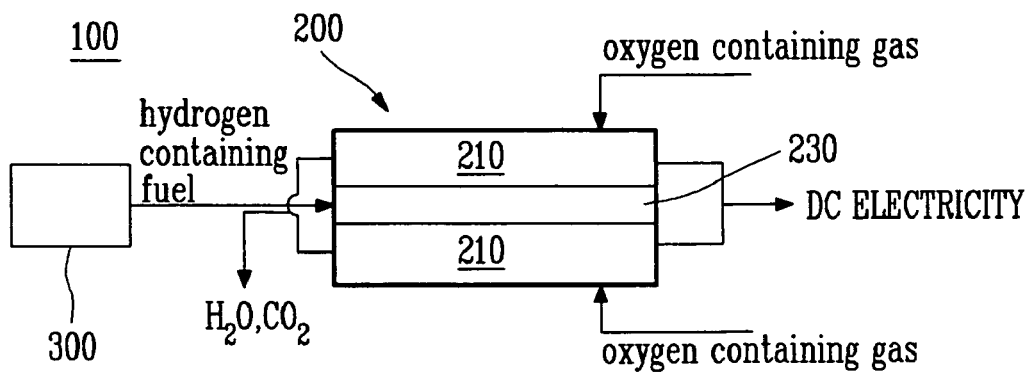
FIG. 1 is a schematic view of a plate type fuel cell system according to an embodiment of the present invention.
Figure 2:
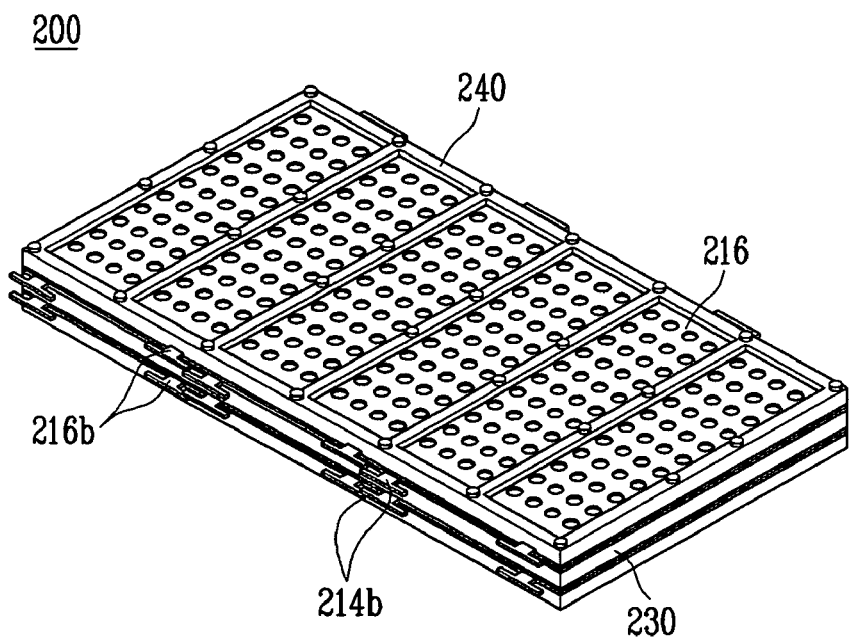
FIG. 2 is a perspective view of a main body portion for the plate type fuel cell system according to an embodiment of the present invention.
Figure 3:
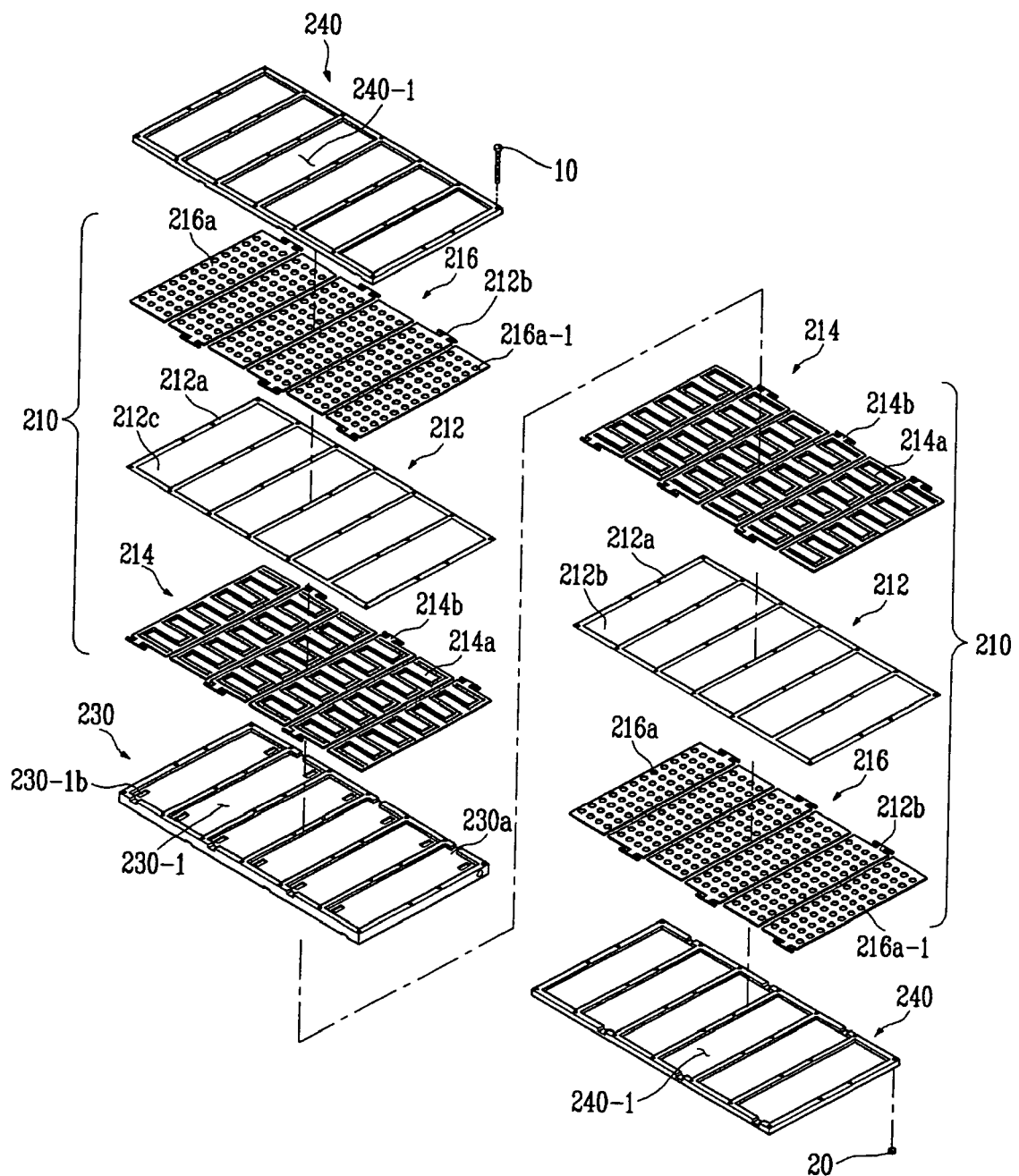
FIG. 3 is an exploded perspective view of the main body portion for the plate type fuel cell system according to an embodiment of the present invention.

FIG. 1 is a schematic view of a plate type fuel cell system according to an embodiment of the present invention, FIG. 2 is a perspective view of a main body portion for the plate type fuel cell system according to an embodiment of the present invention, and FIG. 3 is an exploded perspective view of the main body portion for the plate type fuel cell system according to an embodiment of the present invention.

A plate type fuel cell system 100 according to an embodiment of the present invention includes a main body portion 200 having an electric generator 210 to generate electricity by an electrochemical reaction between hydrogen and oxygen, and a fuel feeder 300 to supply the main body portion 200 with a hydrogen containing fuel.

In the main body portion 200, the electric generator 210 includes an Membrane-Electrode Assembly (MEA) 212 having an electrolyte polymer membrane 212a having selective ion permeability, and a plurality of anode and cathode electrodes 212b and 212c arranged on opposite sides of the electrolyte polymer membrane 212a.

Figure 8:
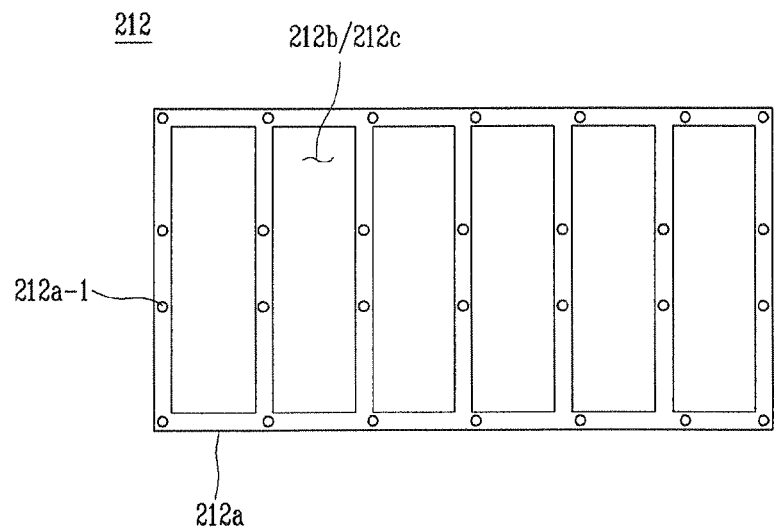
FIG. 8 is a plan view of an electrode-membrane assembly.

As shown in FIG. 8, in the membrane-electrode assembly 212, the electrolyte polymer membrane 212a is provided as a single sheet. On one surface of the electrolyte polymer membrane 212a, the adjacent anode electrodes 212b are spaced apart from each other. The anode electrode 212b includes a supporting layer to supply and diffuse the fuel, and a catalyst layer in which the hydrogen containing fuel is oxidized. Likewise, on the other surface of the electrolyte polymer membrane 212a, the adjacent cathode electrodes 212c are spaced part from each other. The cathode electrode 212c includes a supporting layer to supply and diffuse the fuel, and a catalyst layer in which the oxygen is reduced.

On opposite surfaces of the electrolyte polymer membrane 212a, the anode electrodes 212b and the cathode electrodes 212c are arranged corresponding to each other. In the electrolyte polymer membrane 212a, a plurality of fastening holes 212a-1 is formed in a space between the adjacent anode or cathode electrodes 212b and 212c and in a circumferential edge of the electrolyte polymer membrane 212a. The fastening holes 212a-1 are penetrated by blots 10 when the main body portion 200 is assembled, which will be described later.

Furthermore, the electric generator 210 further includes an anode separator 214 provided to face the anode electrode 212b and formed with a fluid channel 214a-1 for the hydrogen containing fuel, and a cathode separator 216 provided to face the cathode electrode 212c and formed with an air ventilating hole 216a-1.

Figure 4A:
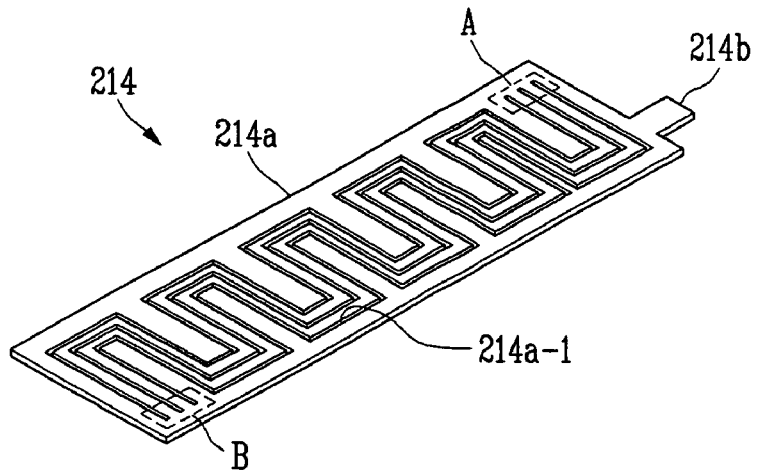
FIGS. 4A and 4B are perspective views of anode separators having respective first and second structures.
Figure 4B:
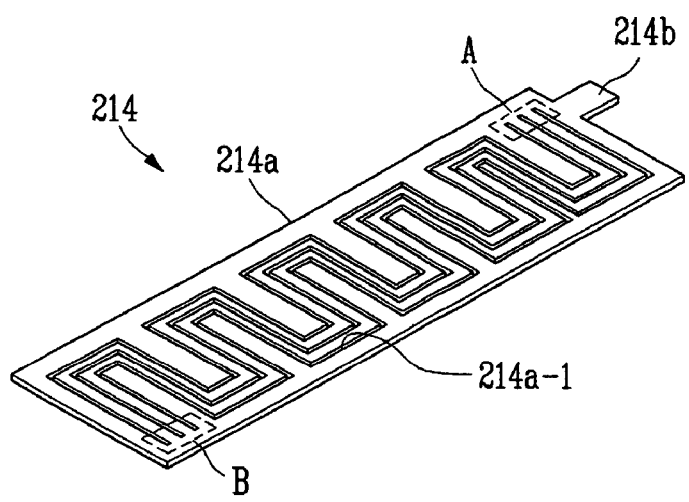
Figure 5:
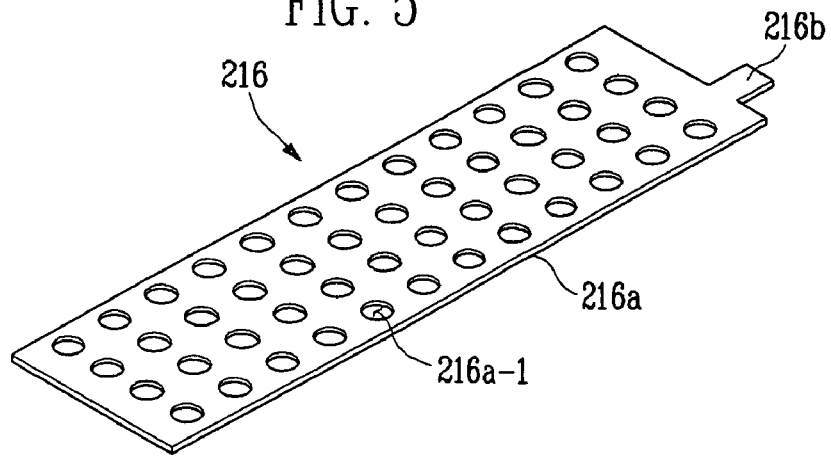
FIG. 5 is a perspective view of a cathode separator.

Referring to FIGS. 4A, 4B and 5, the anode separator 214 is made of a stainless material having good corrosion resistance and rigidity, for example, SUS 304. The anode separator 214 is shaped like a plate facing and corresponding to the anode electrode 212b. Preferably, the anode separator 214 includes a coating layer (not shown) of a conductive material, such as gold (Au), in order to enhance electrical conductivity, which will be described later. Likewise, the cathode separator 216 is made of a stainless material having good corrosion resistance and rigidity, for example, SUS 304. The cathode separator 216 is shaped like a plate facing and corresponding to the cathode electrode 212c. Preferably, the cathode separator 216 includes a coating layer (not shown) of a conductive material, such as gold (Au), in order to enhance electrical conductivity, which will be described later.

As shown in FIGS. 4A and 4B, the anode separator 214 includes an anode main body 214a having a plate shape, and a first output terminal 214b protruding outwardly from one side of the anode main body 214a. The anode main body 214a is formed with the fluid channel 214a-1 through which the hydrogen containing fuel flows. The fluid channel 214a-1 includes an inlet A into which the hydrogen containing fuel is introduced from the fuel distributor 230, a channel portion through which the hydrogen containing fuel flows, and an outlet B through which the hydrogen containing fuel is discharged. Preferably, in the plate type anode main body 214a, the inlet A and the outlet B are disposed diagonally to each other. In this embodiment, there are three channel portions of the fluid channel 214a-1. However, the present invention is not limited thereto. The anode separator 214 can have a first structure (refer to FIG. 4A) in which the first output terminal 214b is spaced from the inlet A or a second structure (refer to FIG. 4B) in which the first output terminal 214b is adjacent to the inlet A.

Referring to FIG. 5, the cathode separator 216 includes a cathode main body 216a having a plate shape, and a second output terminal 216b protruding outwardly from one side of the cathode main body 216a. The cathode main body 216a is formed with a plurality of air ventilating holes 216a-1 through which air passes.

Figure 7:
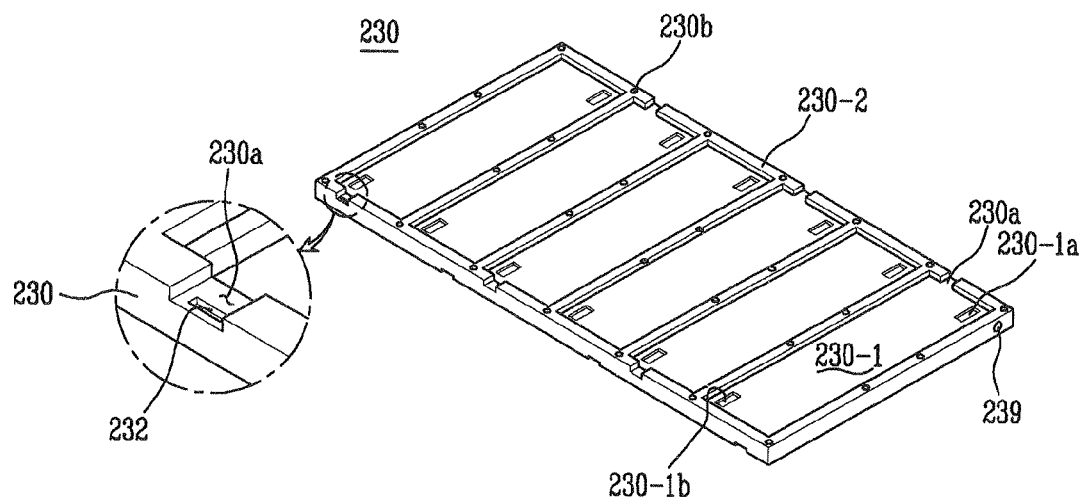
FIG. 7 is a perspective view of a fuel distributor.

According to an embodiment of the present invention, the main body portion 200 further includes the fuel distributor 230 to distribute the hydrogen containing fuel to each of the anode electrodes 212b provided on one surface of the membrane-electrode assembly 212. As shown in FIG. 7, the fuel distributor 230 is formed with an accommodating part 230-1 on the surface thereof to accommodate the anode separator 214, in which the accommodating part 230-1 has a predetermined size defined by ribs 230-2. Preferably, the accommodating part 230-1 is provided on opposite surfaces, i.e., top and bottom surfaces of the fuel distributor 230. The ribs 230-2 and the fuel distributor 230 can be formed as a single body.

A rib cutting part 230a is formed by partially cutting out the rib 230-2. The first output terminal 214b of the anode separator 214 protrudes outwardly through the rib cutting part 230a. According to an embodiment of the present invention, the rib cutting part 230a is formed with groove 232. When the main body portion is assembled with a sealing member, such as silicon resin, applied to the rib cutting part 230a and the first output terminal 214b of the anode separator 214 is placed on the rib cutting part 230a, the sealing member is pressed, so that the groove 232 is filled with the sealing member and the first output terminal 214b of the anode separator 214 is surrounded by the sealing member, thereby enhancing a sealing effect.

The rib 230-2 is formed with a plurality of first fastening holes 230b corresponding to the fastening holes 212a-1 formed in the electrolyte polymer membrane 212a.

The fuel distributor 230 includes an inlet opening 239 formed on one surface thereof and communicating with the fuel feeder 300, through which the hydrogen containing fuel is introduced. Furthermore, the accommodating part 230-1 includes a first opening 230-1a communicating with the inlet opening 239 and through which the hydrogen containing fuel inflows. Also, the accommodating part 230-1 includes a second opening 230-1b through which the hydrogen containing fuel is discharged. Additionally, the fuel distributor 230 includes a fuel supplying manifold (not shown) arranged between the inlet opening 239 and the first opening 230-1a and distributing the hydrogen containing fuel to the first openings 230-1a, and a fuel discharging manifold (not shown) arranged between the second opening 230-1b and a discharging opening (not shown) and collecting the hydrogen containing fuel from the second openings 230-1b.

Figure 6A:
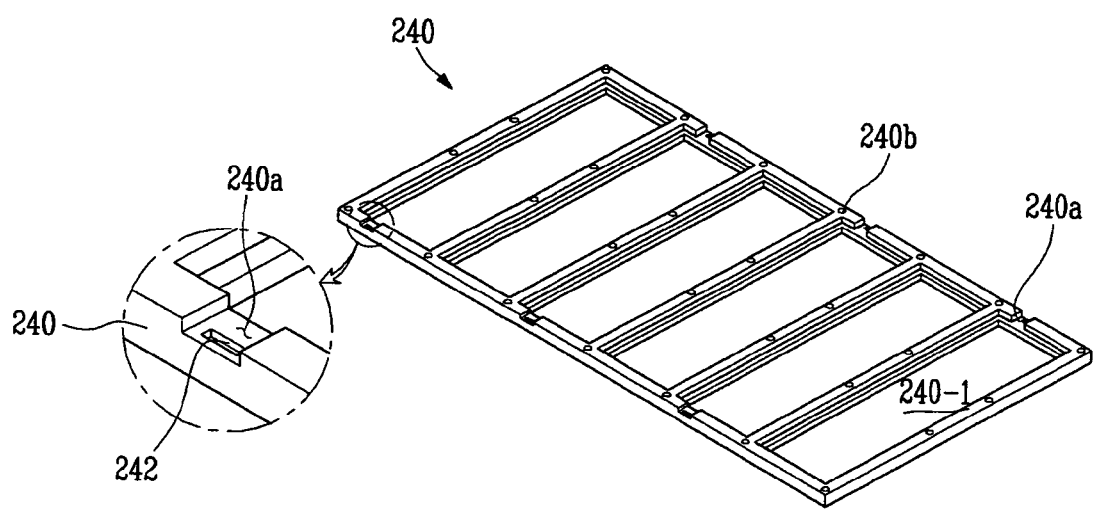
FIGS. 6A and 6B are perspective views of the inside and the outside of an end frame.
Figure 6B:
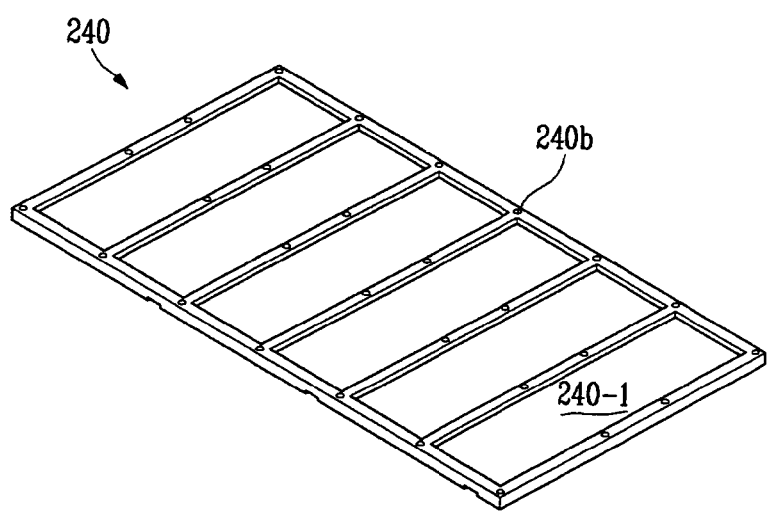

The main body portion 200 includes an end frame 240 formed with a seating part 240-1 in which the cathode separator 216 is seated. Referring to FIGS. 6A and 6B, the end frame 240 includes a plastic having a high strength and non-conductive properties, for example, a PEEK material. Preferably, the end frame 240 has a penetrating structure through the seating part 240-1, so that air is smoothly ventilated through the air ventilating hole 216a-1 formed in the cathode separator 216. A frame defining the seating part 240-1 is formed with a plurality of second fastening holes 240b, and the second fastening holes 240b correspond to the first fastening holes 230b formed in the rib 230-2 of the fuel distributor 230.

The end frame is partially cut out to form a frame cutting part 240a, and the second output terminal 216b of the cathode separator 216 is extended outward through the frame cutting part 240a. According to an embodiment of the present invention, the frame cutting part 240a is formed with a groove 242. A sealing member, such as silicon resin, is applied to the frame cutting part 240a, and then the second output terminal 216b of the cathode separator 216 is placed on the frame cutting part 240a. When the main body portion is assembled, the sealing member is compressed and thus the groove 242 is filled with the sealing member, and the second output terminal 216b of the cathode separator 216 is surrounded by the sealing member, thereby enhancing a sealing effect.

Figure 9:
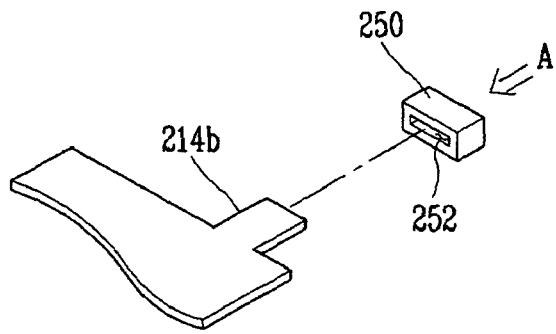
FIG. 9 is a perspective view of a sealing material.
Figure 10A:
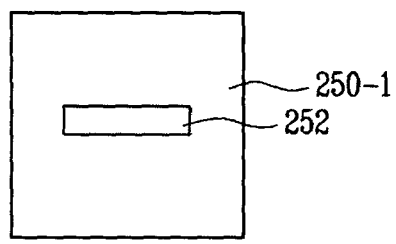
FIGS. 10A, 10B, and 10C are plan views of the sealing material.
Figure 10B:
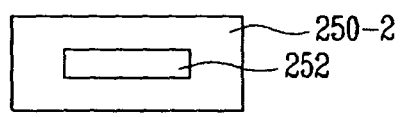
Figure 10C:
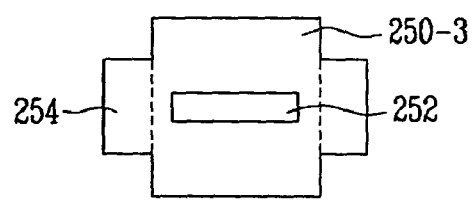
Figure 11:
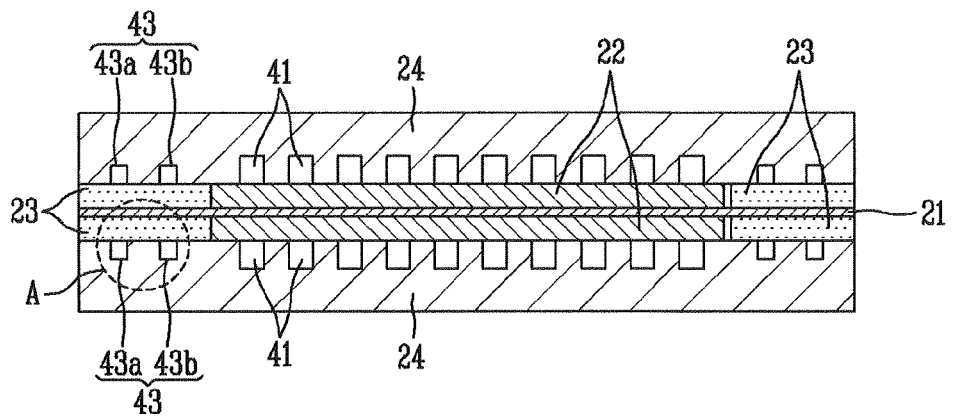
FIG. 11 is a view of a fuel cell stack.
Figure 12:
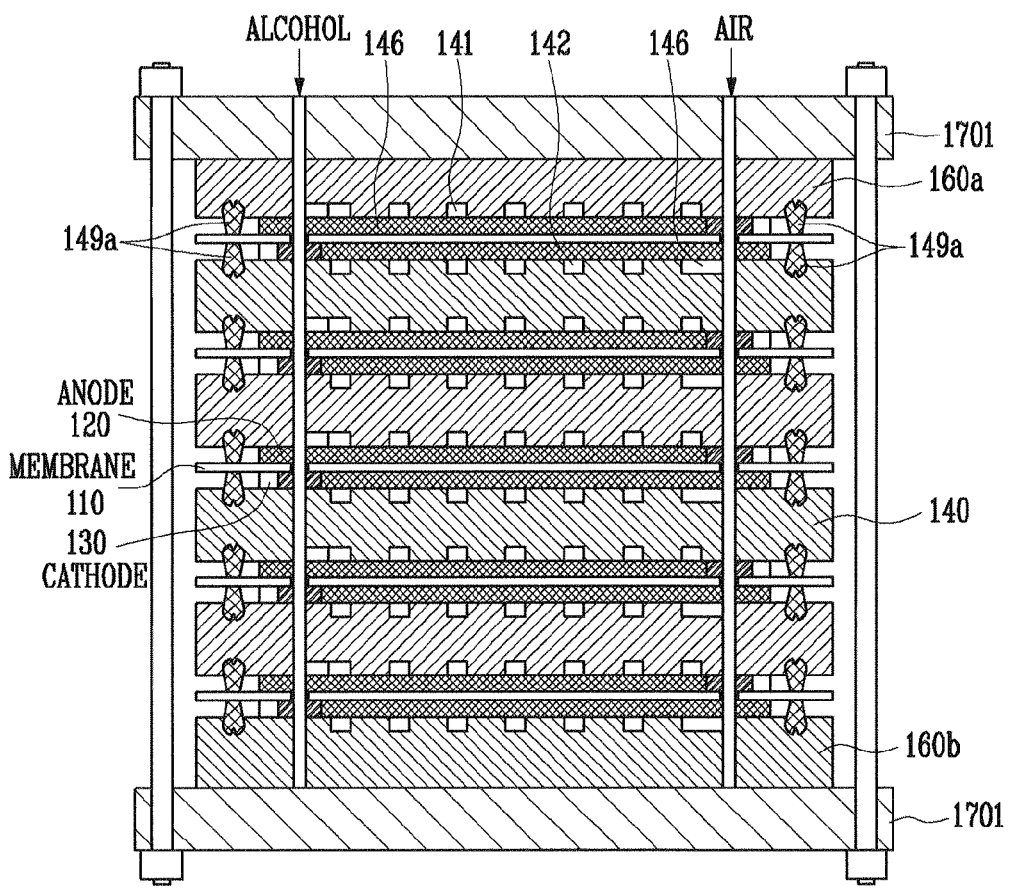
FIG. 12 is a view of another fuel cell stack.

According to an embodiment of the present invention, as shown in FIG. 9, the sealing member can be a hexahedron shape. The hexahedral-sealing member 250 is provided with an opening 252 through which the output terminals 214b or 216b are inserted. The shape of hexahedral-sealing member 250 can be changed when it is viewed in the direction of A as shown in FIGS. 10A, 10B and 10C. In FIG. 10A, the hexahedral-sealing member 250-1 has a square shape with an opening 252. In FIG. 10B, the hexahedral-sealing member 250-2 has a rectangle shape with an opening 252. In FIG. 10C, the hexahedral-sealing member 250-3 has a shape with an opening 252 and wing portions 254. During the assembling process of the main body portion 200, the output terminals 214b or 216b are inserted into the opening 252 of the hexahedral-sealing member 250. The anode separator 214 is then arranged in the accommodating part 230-1 of the fuel distributor and the hexahedral-sealing member 250 surrounding the first output terminal 214b is seated in the rib cutting part 230a. Also, the cathode separator 216 is placed in the seating part 240-1 of the end frame 240 and the hexahedral-sealing member 250 surrounding the second output terminal 216b is seated in the frame cutting part 240a. When the main body portion is assembled, the hexahedral-sealing members 250 are compressed and fill the rib cutting part 230a and the frame cutting part 240a, thereby enhancing a sealing effect.

The main body portion 200 for the fuel cell system 100 according to an embodiment of the present invention is assembled as follows.

According to one embodiment of the present invention, the anode separator 214 is arranged in each of the accommodating parts 230-1 of the fuel distributor 230. The sealing member is applied to the rib cutting part 230a of the fuel distributor 230. According to another embodiment of the present invention, the anode separator 214 with the first output terminal 214b surrounded with the hexahedral-sealing member 250 is arranged in each of the accommodating parts 230-1 of the fuel distributor 230. The hexahedral-sealing member 250 is arranged in the rib cutting part 230a. The membrane-electrode assembly 212 is then arranged so that the anode electrode 212b faces the anode separator 214 of the membrane-electrode assembly 212.

Furthermore, the end frame 240 is arranged so that the cathode separator 216 faces the cathode electrode 212c of the membrane-electrode assembly 212. The end frame 240 has the sealing member applied to the frame cutting part 240a. According to another embodiment of the present invention, since the cathode separator 216 with the second output terminal 216b surrounded by the hexahedral-sealing member 250 is arranged in the seating part 240-1 of the end frame 240, the hexahedral-sealing member 250 is arranged in the frame cutting part 240a of the end frame 240.

Furthermore, a fastening member, such as a bolt 10, penetrates the second fastening hole 240b of the cathode separator 240, the fastening hole 212a-1 of the membrane-electrode assembly 212 and the first fastening hole 230b of the fuel distributor 230, and receives the nut 20, thereby assembling the main body portion 200. By assembling the bolt 10 and the nut 20, the sealing members are compressed and surround the first output terminal 214b of the anode separator 214 and the second output terminal 216b of the cathode separator 216, thereby preventing the reaction fluid, such as the hydrogen containing fuel, from leaking outward. That is, the sealing members are filling the rib cutting part 230a and the frame cutting part 240a, thereby enhancing the sealing effect.

The operation of the fuel cell system according to an embodiment of the present invention is as follows.

The hydrogen containing fuel, e.g., methanol, is introduced from the fuel feeder 300 to the fuel supplying manifold of the fuel distributor 230 through the inlet opening 239. The methanol is then supplied to the inlet A of the anode separator 214 via the first opening 230-1a of the accommodating part 230-1. Furthermore, the methanol flows along the fluid channel 214a-1 of the anode separator 214 and is supplied to the anode electrode 212b. As described above, since the rib cutting part 230a, in which the first output terminal 214b of the anode separator 214 is placed, is sealed by the sealing members, the hydrogen containing fuel cannot leak through the rib cutting part 230a.

The oxygen containing air is supplied to the cathode electrode 212c through the air ventilating holes 216a-1 of the cathode separator 216 via the seating part formed in the end frame 240. As described above, since the frame cutting part 240a, in which the second output terminal 216b of the cathode separator 216 is placed, is sealed by the sealing member, the oxygen containing air cannot leak through the frame cutting part 240a.

In the membrane-electrode assembly 212, Direct Current (DC) electricity is generated by the electrochemical reaction between hydrogen obtained from the methanol and oxygen from the air.

In more detail, the electrochemical reaction arising in the anode electrode 212b and the cathode electrode 212c of the membrane-electrode assembly 212 is as follows.

Anode reaction: $CH_3OH + H_2O \rightarrow CO_2 + 6H^+ + 6e^-$
Cathode reaction: $(3/2)O_2 + 6H^+ 6e^- \rightarrow 3H_2O$
Total: $CH_3OH + (3/2)O_2 \rightarrow H_2O + CO_2$ In the anode electrode 212b, carbon dioxide, six hydrogen ions and six electrons are produced by a reaction between methanol and water (Oxidation). The hydrogen ions are transferred to the cathode electrode 212c through the electrolyte membrane 212a. In the cathode electrode 212c, the hydrogen ions, the electrons transferred from the anode electrode 212b and oxygen are reacted and a byproduct, such as water and carbon dioxide, are produced, thereby generating the electricity. The electricity is supplied to the outside through a collector (not shown) electrically connected to the anode separator 214 and the cathode separator 216.

While the hydrogen containing fuel flows along the fluid channel 214a-1 of the anode separator 214, the extra hydrogen containing fuel, which is not supplied to the anode electrode 212b, is discharged to the fuel discharging manifold through the outlet B and the second opening 230-1b of the fuel distributor 230.

According to an embodiment of the present invention, since the rib cutting part in which the first output terminal of the anode separator is placed and the frame cutting part in which the second output terminal of the cathode separator is placed are sealed by the sealing members, the reaction fluid, such as the hydrogen containing fuel, and oxygen are effectively prevented from leaking through the rib cutting part or the frame cutting part, thereby enhancing the stability of the stack and the power generation efficiency of the fuel cell system.

Although exemplary embodiments of the present invention have been shown and described, it would be appreciated by those skilled in the art that modifications can be made to these embodiment without departing from the principles and spirit of the present invention, the scope of which being defined by the following claims.

What is claimed is:

1. A fuel cell system, comprising:
    an electric generator including a membrane-electrode assembly having a plurality of anode electrodes and a plurality of cathode electrodes arranged on opposite surfaces of a proton-exchange membrane and spaced apart from each other;
    a plurality of anode separators respectively facing the plurality of anode electrodes, each of the anode separators having a fluid channel adapted to receive a hydrogen containing fuel, each of the plurality of anode separators having a first output terminal;
    a plurality of cathode separators respectively facing the plurality of cathode electrodes, each of the cathode separators having an air ventilating hole, each of the plurality of cathode separators having a second output terminal;
    a fuel distributor having a plurality of accommodating parts defined by a rib to accommodate each of the plurality of anode separators and adapted to distribute the hydrogen containing fuel to each of the plurality of anode electrodes, the rib being partially cut out to define a plurality of discrete rib cutting parts; and
    a plurality of sealing members respectively filling each of the plurality of the rib cutting parts.

2. The fuel cell system according to claim 1, wherein the rib cutting part comprises a groove.

3. The fuel cell system according to claim 2, wherein the anode separator includes an extending projection extended outwardly through the rib cutting part.

4. The fuel cell system according to claim 1, further comprising a fuel feeder adapted to supply the fuel distributor with the hydrogen containing fuel.

5. The fuel cell system according to claim 1, wherein the accommodating part of the fuel distributor comprises first and second openings adapted to pass the hydrogen containing fuel.

6. The fuel cell system according to claim 5, wherein the fuel distributor comprises a fuel supplying manifold connected to and communicating with the first opening of the accommodating part, and a fuel discharging manifold connected to and communicating with the second opening.

7. The fuel cell system according to claim 1, wherein the accommodating part is arranged on opposite surfaces of the fuel distributor.

8. The fuel cell system according to claim 1, further comprising an end frame having a plurality of seating parts adapted to seat the plurality of cathode separators, respectively.

9. The fuel cell system according to claim 8, wherein the end frame is partially cut out to define a frame cutting part.

10. The fuel cell system according to claim 9, wherein the cathode separator includes an extending projection extended outwardly through the frame cutting part.

11. The fuel cell system according to claim 10, further comprising a sealing member contained within the frame cutting part.

12. The fuel cell system according to claim 11, wherein the frame cutting part comprises a groove.

13. A fuel cell system, comprising:
an electric generator including a membrane-electrode assembly having a plurality of anode electrodes and a plurality of cathode electrodes arranged on opposite surfaces of a proton-exchange membrane;
a plurality of anode separators respectively facing the plurality of anode electrodes, each of the anode separators having a fluid channel adapted to receive a hydrogen containing fuel, the anode separator having a first extending projection;
a plurality of cathode separators respectively facing the plurality of cathode electrodes, each of the cathode separators having an air ventilating hole, the cathode separator having a second extending projection;
a fuel distributor having a plurality of accommodating parts defined by a rib to accommodate each of the plurality of anode separators and adapted to distribute the hydrogen containing fuel to each of the plurality of anode electrodes, the rib being partially cut out to define a rib cutting part; and
a sealing member contained within the rib cutting part, the sealing member having a hexahedron shape and having an opening adapted to receive the first extending projection of the anode separator.

14. The fuel cell system according to claim 13, wherein the rib cutting part comprises a groove.

15. The fuel cell system according to claim 13, wherein the accommodating part of the fuel distributor comprises first and second openings adapted to pass the hydrogen containing fuel.

16. The fuel cell system according to claim 15, wherein the fuel distributor comprises a fuel supplying manifold connected to and communicating with the first opening of the accommodating part, and a fuel discharging manifold connected to and communicating with the second opening.

17. The fuel cell system according to claim 13, wherein the accommodating part is arranged on opposite surfaces of the fuel distributor.

18. The fuel cell system according to claim 13, further comprising an end frame having a plurality of seating parts adapted to seat each of the plurality cathode separators.

19. The fuel cell system according to claim 18, wherein the end frame is partially cut out to define a frame cutting part.

20. The fuel cell system according to claim 19, further comprising a sealing member contained within the frame cutting part, the sealing member having a hexahedron shape and having an opening adapted to receive the second extending projection of the cathode separator.

21. The fuel cell system according to claim 20, wherein the frame cutting part comprises a groove.

* * * * *